(12) United States Patent
Lee et al.

(10) Patent No.: US 10,455,483 B2
(45) Date of Patent: Oct. 22, 2019

(54) METHOD AND APPARATUS FOR PERFORMING ACCESS CONTROL FOR NETWORK SHARING IN WIRELESS COMMUNICATION SYSTEM

(71) Applicant: LG ELECTRONICS INC., Seoul (KR)

(72) Inventors: Youngdae Lee, Seoul (KR); Jaehyun Kim, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 11 days.

(21) Appl. No.: 15/319,923

(22) PCT Filed: Jul. 13, 2015

(86) PCT No.: PCT/KR2015/007246
§ 371 (c)(1),
(2) Date: Dec. 19, 2016

(87) PCT Pub. No.: WO2016/006980
PCT Pub. Date: Jan. 14, 2016

(65) Prior Publication Data
US 2017/0135028 A1    May 11, 2017

Related U.S. Application Data

(60) Provisional application No. 62/023,199, filed on Jul. 11, 2014.

(51) Int. Cl.
*H04L 1/00* (2006.01)
*H04W 48/16* (2009.01)
(Continued)

(52) U.S. Cl.
CPC ........... *H04W 48/16* (2013.01); *H04W 48/06* (2013.01); *H04W 48/02* (2013.01); *H04W 84/042* (2013.01)

(58) Field of Classification Search
CPC . H04W 28/0289; H04W 28/06; H04W 84/12; H04W 48/06; H04L 47/12
See application file for complete search history.

(56) References Cited

U.S. PATENT DOCUMENTS

| | | | | |
|---|---|---|---|---|
| 2012/0244853 A1* | 9/2012 | Iwamura | ............... | H04W 48/02 455/422.1 |
| 2013/0040597 A1* | 2/2013 | Jang | ..................... | H04W 48/02 455/404.1 |

(Continued)

FOREIGN PATENT DOCUMENTS

| | | |
|---|---|---|
| EP | 2809102 A1 | 12/2014 |
| EP | 2849480 A1 | 3/2015 |

(Continued)

OTHER PUBLICATIONS

3GPP TSG RAN WG2 #86, R2-142290, May 19, 2014 to May 23, 2014, Seoul, korea (Year: 2014).*

(Continued)

*Primary Examiner* — Atique Ahmed
(74) *Attorney, Agent, or Firm* — Birch, Stewart, Kolasch & Birch, LLP (57) ABSTRACT

A method and apparatus for transmitting barring information in a wireless communication system is provided. A lower layer of a user equipment, i.e. a radio resource control (RRC) layer of the UE, receives system information including barring information for a plurality of public land mobile networks (PLMNs) from an evolved NodeB (eNB), and forwards barring information for a specific PLMN, among (Continued)

the barring information for the plurality of PLMNs, to an upper layer of the UE, i.e. an application layer of the UE.

11 Claims, 8 Drawing Sheets

(51) Int. Cl.
*H04W 48/06* (2009.01)
*H04W 48/02* (2009.01)
*H04W 84/04* (2009.01)

(56) References Cited

U.S. PATENT DOCUMENTS

| | | | |
|---|---|---|---|
| 2013/0189978 A1 | 7/2013 | Lee et al. | |
| 2013/0294396 A1* | 11/2013 | Iwamura | H04W 72/04 370/329 |
| 2014/0080531 A1* | 3/2014 | Du | H04W 74/006 455/509 |
| 2014/0171096 A1* | 6/2014 | Hwang | H04W 48/02 455/452.1 |
| 2014/0315548 A1* | 10/2014 | Ramachandran | H04W 48/16 455/434 |
| 2015/0004924 A1* | 1/2015 | Kim | H04W 4/90 455/404.1 |
| 2015/0055447 A1* | 2/2015 | Jamadagni | H04W 48/02 370/216 |
| 2015/0126205 A1 | 5/2015 | Kim et al. | |
| 2015/0173119 A1* | 6/2015 | Wirtanen | H04W 48/06 455/452.1 |
| 2015/0223146 A1* | 8/2015 | Pinheiro | H04W 4/14 370/230 |
| 2015/0249951 A1* | 9/2015 | Jung | H04W 48/08 455/435.1 |
| 2015/0257161 A1* | 9/2015 | Hsu | H04L 65/80 455/453 |

FOREIGN PATENT DOCUMENTS

| | | |
|---|---|---|
| JP | 2014-33385 A | 2/2014 |
| WO | WO 2012/050841 A1 | 4/2012 |
| WO | WO 2013/068839 A1 | 5/2013 |
| WO | WO 2013/112019 A1 | 8/2013 |
| WO | WO 2013/169013 A1 | 11/2013 |
| WO | WO 2014/042462 A1 | 3/2014 |

OTHER PUBLICATIONS

TSG RAN WG2 #86, R2-142290, May 19 to May 23, 2014, Seoul, korea (Year: 2014).*
3GPP TS 22.011 V13.0.0 (Jun. 2014), "3rd Generation Partnership Project; Technical Specification Group Services and System Aspects; Service accessibility (Release 13)", Technical Specification, published on Jun. 2014.
3GPP TS 24.173 V11.2.0 (Mar. 2012), "3rd Generation Partnership Project; Technical Specification Group Core Network and Terminals; IMS multimedia telephony communication service and supplementary services; Stage 3 (Release 11)", Technical Specification, published on Mar. 2012.
3GPP TS 36.331 V11.0.0 (Jun. 2012), "3rd Generation Partnership Project; Technical Specification Group Radio Access Network; Evolved Universal Terrestrial Radio Access (E-UTRA); Radio Resource Control (RRC); Protocol specification (Release 11)", Technical Specification, published on Jun. 2012.
Samsung, "Skipping ACB check for MMTEL-voice/video and SMS", 3GPP TSG RAN WG2 #86, R2-142290, Seoul, Korea, May 9, 2014, (http://www.3gpp.org/ftp/tsg_ran/WG2_RL2/TSGR2_86/docs/), total 7 pages, see pp. 1-2.

* cited by examiner

METHOD AND APPARATUS FOR PERFORMING ACCESS CONTROL FOR NETWORK SHARING IN WIRELESS COMMUNICATION SYSTEM

CROSS REFERENCE TO RELATED APPLICATIONS

This application is the National Phase of PCT International Application No. PCT/KR2015/007246, filed on Jul. 13, 2015, which claims priority under 35 U.S.C. 119(e) to U.S. Provisional Application No. 62/023,199, filed on Jul. 11, 2014, all of which are hereby expressly incorporated by reference into the present application.

TECHNICAL FIELD

The present invention relates to wireless communications, and more particularly, to a method and apparatus for performing access control for network sharing in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Under certain circumstances, it will be desirable to prevent user equipment (UE) users from making access attempts (including emergency call attempts) or responding to pages in specified areas of a public land mobile network (PLMN). Such situations may arise during states of emergency, or where 1 of 2 or more co-located PLMNs has failed. Broadcast messages should be available on a cell by cell basis indicating the class(es) or categories of subscribers barred from network access. The use of these facilities allows the network operator to prevent overload of the access channel under critical conditions. It is not intended that access control be used under normal operating conditions. It should be possible to differentiate access control between circuit-switched (CS) and packet-switched (PS) domains.

Various access control schemes may be defined in 3GPP LTE, which may include access class barring (ACB), extended access barring (EAB), service specific access control (SSAC), and application specific congestion control for data communication (ACDC). For network sharing in which multiple PLMNs share a cell, a method for performing access control may be required.

DISCLOSURE OF INVENTION

Technical Problem

The present invention provides a method and apparatus for performing access control for network sharing in a wireless communication system. The present invention provides a method and apparatus for performing access class barring (ACB) and service specific access control (SSAC) for network sharing. The present invention provides a method and apparatus for transmitting barring information for a specific public land mobile network (PLMN) to an upper layer.

Solution to Problem

In an aspect, a method for transmitting, by a lower layer of a user equipment (UE), barring information in a wireless communication system is provided. The method includes receiving system information including barring information for a plurality of public land mobile networks (PLMNs) from an evolved NodeB (eNB), and forwarding barring information for a specific PLMN, among the barring information for the plurality of PLMNs, to an upper layer of the UE.

The method may further include receiving a request for the barring information for the specific PLMN from the upper layer.

The lower layer may be a radio resource control (RRC) layer.

The upper layer may be a multimedia telephony (MMTEL) layer.

The barring information may be service specific access control (SSAC) barring information.

The system information may be a system information block type-2 (SIB2).

The plurality of PLMNs may share a cell.

The specific PLMN may be selected by the upper layer.

The specific PLMN may be a registered PLMN (R-PLMN).

The barring information for the specific PLMN may be forwarded upon PLMN selection or reselection, upon update of the barring information at a cell, or upon update of the system information at the cell.

The method may further include receiving a service request from a non-access stratum (NAS) layer of the UE.

The method may further include performing access control barring (ACB) check.

The method may further include skipping performing ACK check according to ACK skip bits for the specific PLMN.

The method may further include transmitting a RRC connection request message to the eNB.

In another aspect, a user equipment (UE) includes a memory, a transceiver, and a processor, in a lower layer, coupled to the memory and the transceiver, and configured to control the transceiver to receive system information including barring information for a plurality of public land mobile networks (PLMNs), and control the transceiver to forward barring information for a specific PLMN, among the barring information for the plurality of PLMNs, to an upper layer.

Advantageous Effects of Invention

Different PLMN can apply different congestion control efficiently.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink LTE-advance (LTE-A) is an evolution of the 3GPP LTE.

For clarity, the following description will focus on the LTE-A. However, technical features of the present invention are not limited thereto.

Figure 1:
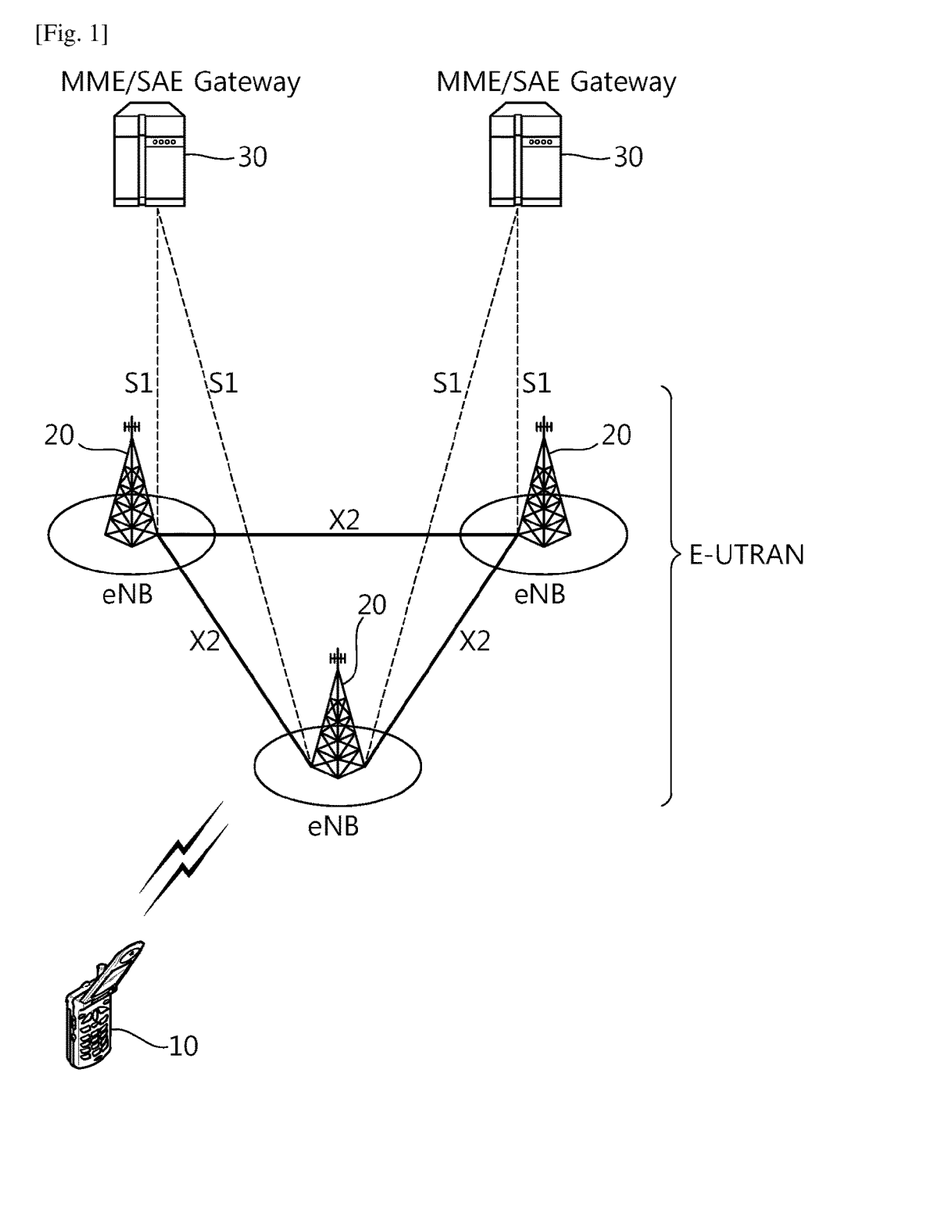
FIG. 1 shows LTE system architecture.

FIG. 1 shows LTE system architecture. The communication network is widely deployed to provide a variety of communication services such as voice over internet protocol (VoIP) through Internet protocol (IP) multimedia subsystem (IMS) and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
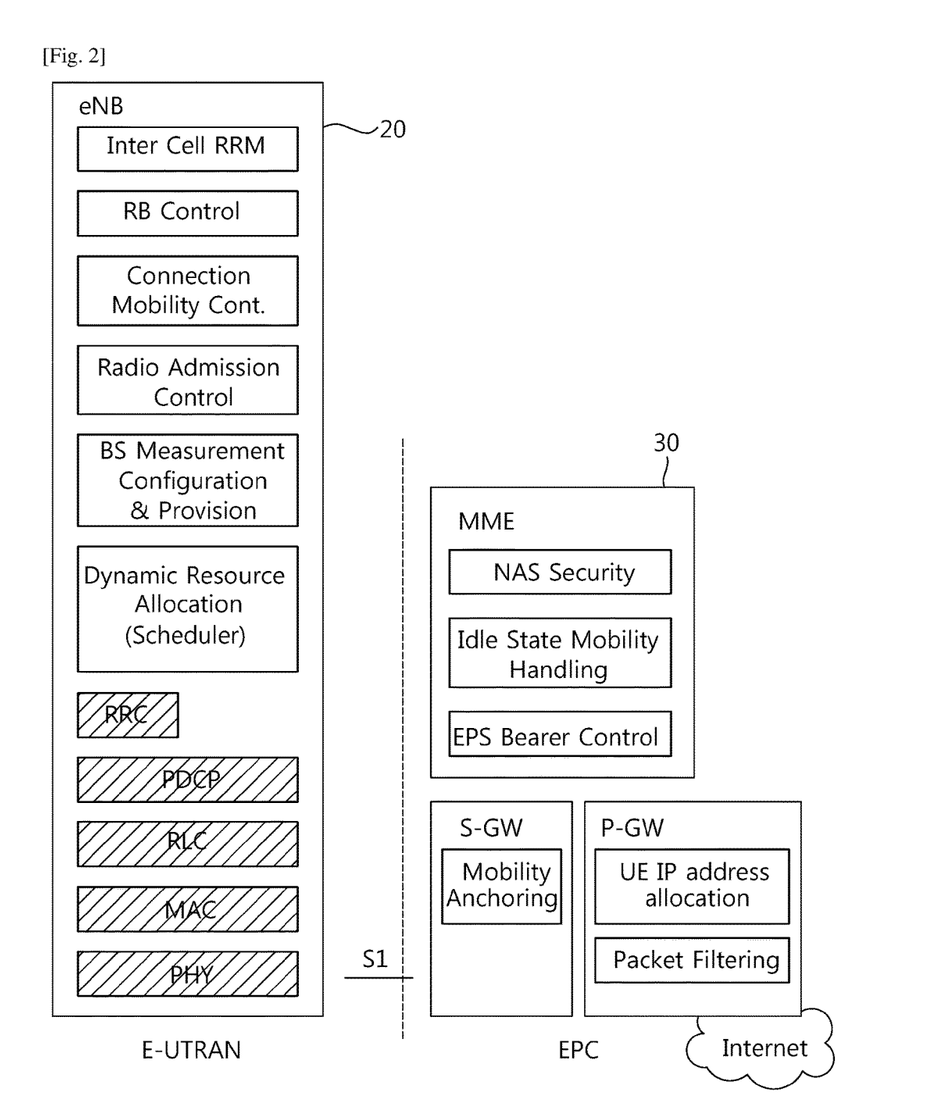
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
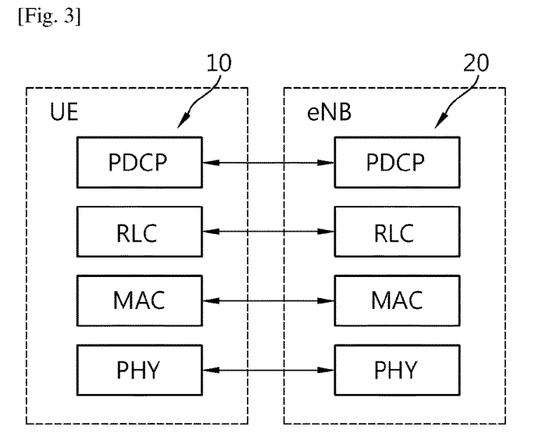
FIG. 3 shows a block diagram of a user plane protocol stack of an LTE system.
Figure 4:
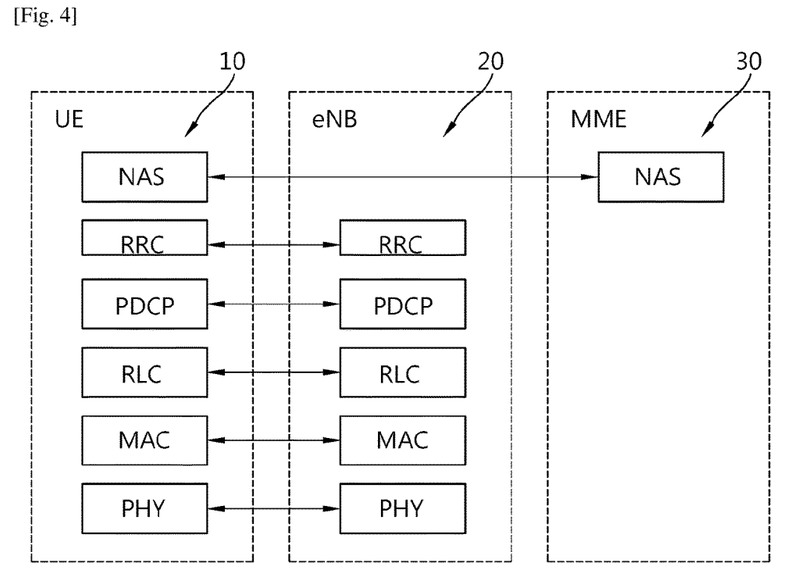
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
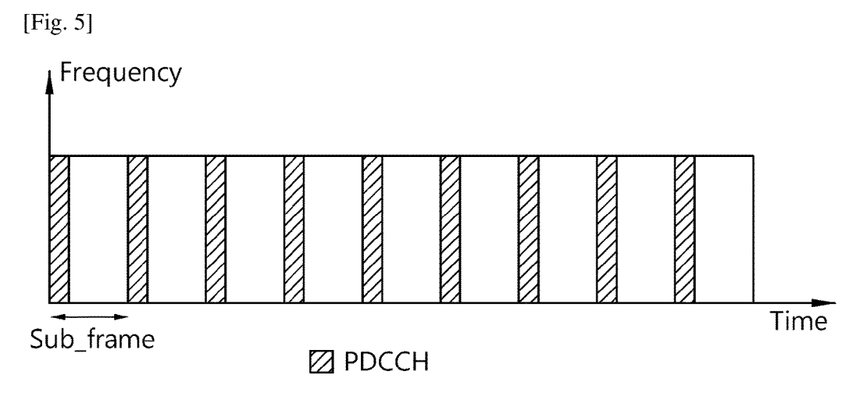
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Access class barring (ACB) check is described. It may be referred to Section 5.3.3.11 of 3GPP TS 36.331 V11.0.0 (2012-06) and/or Section 4.3.1 of 3GPP TS 22.011 V13.0.0 (2014-06). If the UE is a member of at least one access class which corresponds to the permitted classes as signaled over the air interface, and the access class is applicable in the serving network, access attempts are allowed. Additionally, in the case of the access network being UTRAN the serving network can indicate that UEs are allowed to respond to paging and perform location registration, even if their access class is not permitted. Otherwise access attempts are not allowed. Also, the serving network can indicate that UEs are restricted to perform location registration, although common access is permitted. If the UE responded to paging it shall follow the normal defined procedures and react as specified to any network command.

1> if timer T302 or "Tbarring" is running?
2> consider access to the cell as barred;
1> else if SystemInformationBlockType2 includes "AC barring parameter":
2> if the UE has one or more ACs, as stored on the USIM, with a value in the range 11 . . . 15, which is valid for the UE to use (ACs 12, 13, 14 are only valid for use in the home country and ACs 11, 15 are only valid for use in the home PLMN (HPLMN)/equivalent HPLMN (EHPLMN)), and
2> for at least one of these valid Access Classes the corresponding bit in the ac-BarringForSpecialAC contained in "AC barring parameter" is set to zero:
3> consider access to the cell as not barred;
2> else:
3> draw a random number 'rand' uniformly distributed in the range: 0≤rand<1;
3> if 'rand' is lower than the value indicated by ac-BarringFactor included in "AC barring parameter":
4> consider access to the cell as not barred;
3> else:
4> consider access to the cell as barred;
1> else:
2> consider access to the cell as not barred;
1> if access to the cell is barred and both timers T302 and "Tbarring" are not running:
2> draw a random number 'rand' that is uniformly distributed in the range 0≤rand<1;
2> start timer "Tbarring" with the timer value calculated as follows, using the ac-BarringTime included in "AC barring parameter":
"Tbarring"=(0.7+0.6*rand)*ac-BarringTime.

Service specific access control (SSAC) in multimedia telephony (MMTEL) layer is described. It may be referred to Annex J.2.1.1 of 3GPP TS 24.173 V11.2.0 (2012-03). The following information is provided by lower layer:
BarringFactorForMMTEL-Voice: barring rate for MMTEL voice;
BarringTimeForMMTEL-Voice: barring timer for MMTEL voice;
BarringFactorForMMTEL-Video: barring rate for MMTEL video; and
BarringTimeForMMTEL-Video: barring timer for MMTEL video.

Upon request from a user to establish a MMTEL communication session, the UE shall:
1> if the MMTEL communication session to be established is an emergency session, then skip the rest of steps below and continue with session establishment;
2> retrieve SSAC related information mentioned above from lower layers;
3> if video is offered in the multimedia telephony communication session:
A> if back-off timer Tx is running, reject the MMTEL communication session establishment and skip the rest of steps below; or
B> else, then:
I> draw a new random number "rand1" that is uniformly distributed in the range 0≤rand1<1; and
II> if the random number "rand1" is lower than BarringFactorForMMTEL-Video, then skip the rest of steps below and continue with session establishment;
III> else, then;
i> draw a new random number "rand2" that is uniformly distributed in the range 0≤rand2<1; and
ii> start back-off timer Tx with the timer value calculated using the formula:

$$Tx=(0.7+0.6*rand2)*BarringTimeForMMTEL\text{-}Video;$$
and iii> reject the multimedia telephony communication session establishment and skip the rest of steps below;
4> if audio is offered in the MMTEL communication session:
A> if back-off timer Ty is running, reject the MMTEL communication session establishment and skip the rest of steps below; or
B> else, then;
I> draw a new random number "rand3" that is uniformly distributed in the range 0≤rand3<1; and
II> if the random number "rand3" is lower than BarringFactorForMMTEL-Voice, then skip the rest of steps below and continue with session establishment;
III> else, then;
i> draw a new random number "rand4" that is uniformly distributed in the range 0≤rand4<1; and
ii> start timer Ty with the timer value calculated using the formula:

$$Ty=(0.7+0.6*rand4)*BarringTimeForMMTEL\text{-}Voice;$$
and iii> reject the multimedia telephony communication session establishment;

If the MMTEL communication implementation and the access stratum protocol implementation are located in separate physical entities, it is expected that the interconnecting protocol supports the transfer of information elements needed for the SSAC enforcement.

SSAC is not activated when the UE is in other radio accesses (e.g., UTRAN/GERAN). And when the UE camping on E-UTRAN moves to other radio accesses (e.g., UTRAN/GERAN), back-off timer (Tx or Ty or both) shall be stopped if running Handling of SSAC related parameters is described. It may be referred to Section 5.3.3.10 of 3GPP TS 36.331 V11.0.0 (2012-06). Upon request from the upper layers, the UE shall:

1> set the local variables BarringFactorForMMTEL-Voice and BarringTime-ForMMTEL-Voice as follows:

2> if the UE is in RRC_IDLE and ssac-BarringForMMTEL-Voice is present:

3> if the UE has one or more access classes (ACs), as stored on the universal subscriber identification module (USIM), with a value in the range 11 . . . 15, which is valid for the UE to use (ACs 12, 13, 14 are only valid for use in the home country and ACs 11, 15 are only valid for use in the HPLMN/EHPLMN), and 3> if, for at least one of these access classes, the corresponding bit in the ac-Barring-ForSpecialAC contained in ssac-BarringForMMTEL-Video is set to zero:

4> set BarringFactorForMMTEL-Video to one and BarringTimeForMMTEL-Video to zero;

3> else:

4> set BarringFactorForMMTEL-Video and BarringTimeForMMTEL-Video to the value of ac-BarringFactor and ac-BarringTime included in ssac-BarringForMMTEL-Video, respectively;

2> else set BarringFactorForMMTEL-Video to one and BarringTimeForMMTEL-Video to zero;

1> forward the variables BarringFactorForMMTEL-Voice, BarringTime-ForMMTEL-Voice, BarringFactorForMMTEL-Video and BarringTimeForMMTEL-Video to the upper layers;

The SystemInformationBlockType2 information element (IE) (hereinafter, SIB2) contains radio resource configuration information that is common for all UEs. Table 1 shows an example of the SIB2. The SIB2 includes parameters for the ACB and SSAC described above.

TABLE 1

-- ASN1STARTSystemInformationBlockType2 ::= SEQUENCE {ac-BarringInfo
SEQUENCE {ac-BarringForEmergency BOOLEAN,ac-BarringForMO-Signalling
AC-BarringConfig OPTIONAL, -- Need OPac-BarringForMO-Data AC-
BarringConfig OPTIONAL -- Need OP} OPTIONAL, -- Need OPradioResourceConfig
Common RadioResourceConfigCommonSIB,ue-TimersAndConstants UE-
TimersAndConstants,freqInfo SEQUENCE {ul-CarrierFreq ARFCN-ValueEUTRA
OPTIONAL, -- Need OPul-Bandwidth ENUMERATED {n6, n15, n25, n50, n75,
n100}OPTIONAL, -- Need OPadditionalSpectrumEmission AdditionalSpectrum
Emission},mbsfn-SubframeConfigList MBSFN-SubframeConfigList
OPTIONAL, -- Need ORtimeAlignmentTimerCommon TimeAlignment
Timer,...,lateNonCriticalExtension OCTET STRING (CONTAINING SystemInformation
BlockType2-v8h0-IEs)OPTIONAL, -- Need OP[[ ssac-Barring
ForMMTEL-Voice-r9 AC-BarringConfig OPTIONAL, -- Need OPssac-
BarringForMMTEL-Video-r9 AC-BarringConfig OPTIONAL -- Need OP]],[[ ac-
BarringForCSFB-r10 AC-BarringConfig OPTIONAL -- Need
OP]]}SystemInformationBlockType2-v8h0-IEs ::= SEQUENCE {multiBandInfoList
SEQUENCE (SIZE (1..maxMultiBands)) OF AdditionalSpectrumEmission
OPTIONAL, -- Need ORnonCriticalExtension SystemInformation-
BlockType2-v9e0-IEs OPTIONAL -- Need
OP}SystemInformationBlockType2-v9e0-IEs ::= SEQUENCE {ul-CarrierFreq-v9e0
ARFCN-ValueEUTRA-v9e0 OPTIONAL, -- Cond ul-FreqMaxnonCriticalExtension
SEQUENCE { } OPTIONAL -- Need OP}AC-BarringConfig ::= SEQUENCE
{ac-BarringFactor ENUMERATED {p00, p05, p10, p15, p20, p25, p30, p40,p50,
p60, p70, p75, p80, p85, p90, p95},ac-BarringTime ENUMERATED {s4, s8, s16,
s32, s64, s128, s256, s512},ac-BarringForSpecialAC BIT STRING
(SIZE(5))}MBSFN-SubframeConfigList ::=SEQUENCE (SIZE
(1..maxMBSFN-Allocations)) OF MBSFN-SubframeConfig-- ASN1STOP 3> if, for at least one of these access classes, the corresponding bit in the ac-Barring-ForSpecialAC contained in ssac-BarringForMMTEL-Voice is set to zero:

4> set BarringFactorForMMTEL-Voice to one and BarringTimeForMMTEL-Voice to zero;

3> else:

4> set BarringFactorForMMTEL-Voice and BarringTimeForMMTEL-Voice to the value of ac-BarringFactor and ac-BarringTime included in ssac-BarringForMMTEL-Voice, respectively;

2> else set BarringFactorForMMTEL-Voice to one and BarringTimeForMMTEL-Voice to zero;

1> set the local variables BarringFactorForMMTEL-Video and BarringTime-ForMMTEL-Video as follows:

2> if the UE is in RRC_IDLE and ssac-BarringForMMTEL-Video is present:

3> if the UE has one or more access classes, as stored on the USIM, with a value in the range 11 . . . 15, which is valid for the UE to use, and Referring to Table 1, the ac-BarringFactor field indicates a reference for ACB. If the random number drawn by the UE is lower than this value, access is allowed. Otherwise the access is barred. The ac-BarringForCSFB field indicates ACB for mobile originating (MO) circuit-switch (CS) fallback. The ac-BarringForEmergency field indicates ACB for AC 10. The ac-BarringForMO-Data field indicates ACB for MO calls. The ac-BarringForMO-Signalling field indicates ACB for MO signaling. The ac-BarringForSpecialAC field indicates ACB for AC 11-15. The first/leftmost bit is for AC 11, the second bit is for AC 12, and so on. The ac-BarringTime field indicates access barring time value in seconds. The ssac-BarringForMMTEL-Video field indicates SSAC for MMTEL video originating calls. The ssac-BarringForMMTEL-Voice field indicates SSAC for MMTEL voice originating calls.

Additionally, the SIB2 may further include 3 bits of ACB skip bits. The first bit of the ACB skip bits may indicate whether or not to skip ACB in case that MMTEL voice call is initiated from the UE. The second bit of the ACB skip bits may indicate whether or not to skip ACB in case that MMTEL video call is initiated from the UE. The third bit of the ACB skip bits may indicate whether or not to skip ACB in case that short message service (SMS) is initiated from the UE. More specifically, if the network indicates that ACB is skipped for MMTEL voice, the RRC layer of the UE may skip ACB check before sending the RRC connection request message to the network, upon receiving the service request message for MO MMTEL voice from the NAS layer of the UE. If the network indicates that ACB is skipped for MMTEL video, the RRC layer of the UE may skip ACB check before sending the RRC connection request message, upon receiving the service request message for MO MMTEL video from the NAS layer of the UE. If the network indicates that ACB is skipped for SMS, the RRC layer of the UE may skip ACB check before sending the RRC connection request message, upon receiving the service request message for MO SMS from the NAS layer of the UE.

Application specific congestion control for data communication (ACDC) is described. ACDC is an access control mechanism for the operator to allow/prevent new access attempts from particular, operator-identified applications in the UE. The network may prevent/mitigate overload of the access network and/or the core network. This feature is optional. For ACDC, the following requirements may apply:
   This feature shall be applicable to UTRAN and E-UTRAN.
   This feature shall be applicable to UEs that are not a member of one or more of access classes 11 to 15.
   The home network shall be able to configure a UE with multiple ACDC categories to each of which particular, operator-identified applications are associated. The categories shall be ranked in order of importance.
   The serving network shall be able to broadcast, in one or more areas of the RAN, control information per each ACDC category, indicating, e.g. barring rates, and whether a roaming UE shall be subject to ACDC control.
   The UE shall be able to control whether or not access attempt for certain application is allowed, based on this broadcast control information and the configuration of categories in the UE.
   The serving network shall be able to simultaneously indicate ACDC with other forms of access control.
   When both ACDC and ACB controls are indicated, ACDC shall override ACB.
   In the case of multiple core networks sharing the same access network, the access network shall be able to apply ACDC for the different core networks individually. For the mitigation of congestion in a shared RAN, barring rates should be set equal for all participating operators.

According to the prior art, a cell broadcasts ACB barring information and SSAC barring information via system information, as described in Table 1. Currently, the ACB barring information and SSAC barring information are common to all PLMNs. Meanwhile, network sharing in which multiple PLMNs share a cell may be introduced. In this case, different PLMNs may want to apply different ACB barring information and/or SSAC barring information. However, that is not possible currently.

In order to solve the problem described above, a method for performing access control for network sharing according to an embodiment of the present invention is described below. According to an embodiment of the present invention, the UE may receive barring information per PLMN for all PLMNs sharing the cell at a lower layer, i.e. RRC layer. The UE may forward the received barring information corresponding to registered PLMN (R-PLMN) to an upper layer, i.e. NAS layer or application layer (e.g. MMTEL layer). The UE may re-forward the received barring information corresponding to the R-PLMN to an upper layer, either upon update of system information or barring information, or upon PLMN change.

Figure 6:
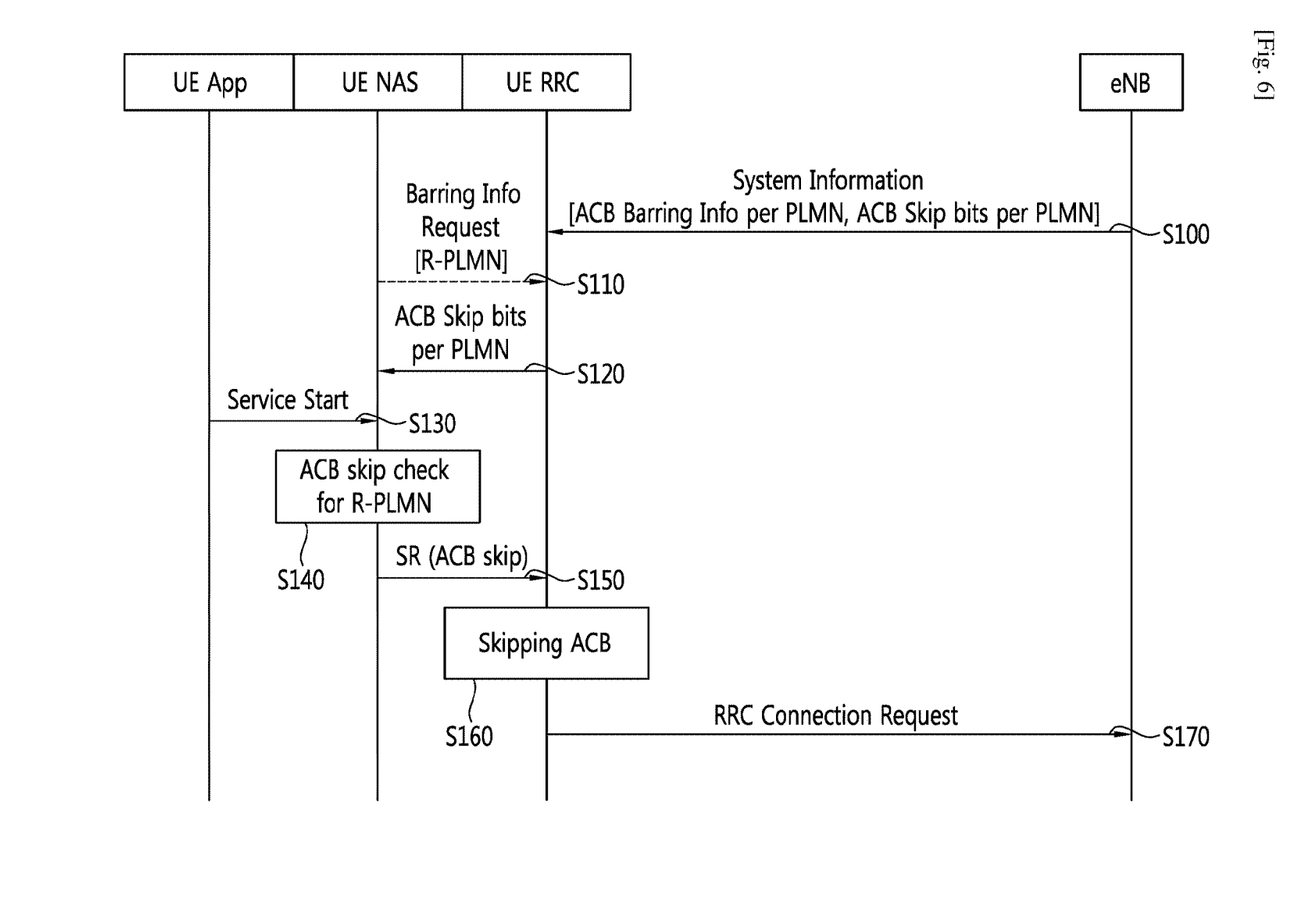
FIG. 6 shows an example of a method for performing ACB skip check for R-PLMN in a NAS layer according to an embodiment of the present invention.

FIG. 6 shows an example of a method for performing ACB skip check for R-PLMN in a NAS layer according to an embodiment of the present invention.

In step S100, the UE camps on a cell. The RRC layer of the UE receives system information including ACB barring information per PLMN and ACB skip bits per PLMN for all PLMNs sharing the cell. In step S110, the RRC layer of the UE may receive request for barring information for R-PLMN from the NAS layer of the UE.

In step S120, the RRC layer of the UE forwards the received ACB skip bits per PLMN for all PLMNs sharing the cell to the NAS layer of the UE, upon receiving request with a PLMN identity from the NAS layer of the UE, upon PLMN (re-)selection, upon update of ACB skip bits at the cell or upon update of system information at the cell. Alternatively, the RRC layer of the UE may check the R-PLMN and forwards the received ACB skip bits only for the R-PLMN upon receiving request with a PLMN identity from the NAS layer of the UE, upon PLMN (re-)selection, upon update of ACB skip bits at the cell or upon update of system information at the cell.

In step S130, the NAS layer of the UE receives service start from the upper layer, i.e. application layer, for a specific service/application, such as MMTEL voice, MMTEL video, or SMS. In step S140, the NAS layer of the UE determines whether or not to skip ACB check by using the ACB skip bits corresponding to the R-PLMN among the forwarded ACB skip bits. In step S150, if the NAS layer of the UE determines to skip ACB check, the NAS layer of the UE informs the RRC layer of the UE that ACB check shall be skipped via service request (SR).

In step S160, the RRC layer of the UE skips ACB check accordingly. In step S170, the RRC layer of the UE transmits the RRC connection request message to the eNB.

Figure 7:
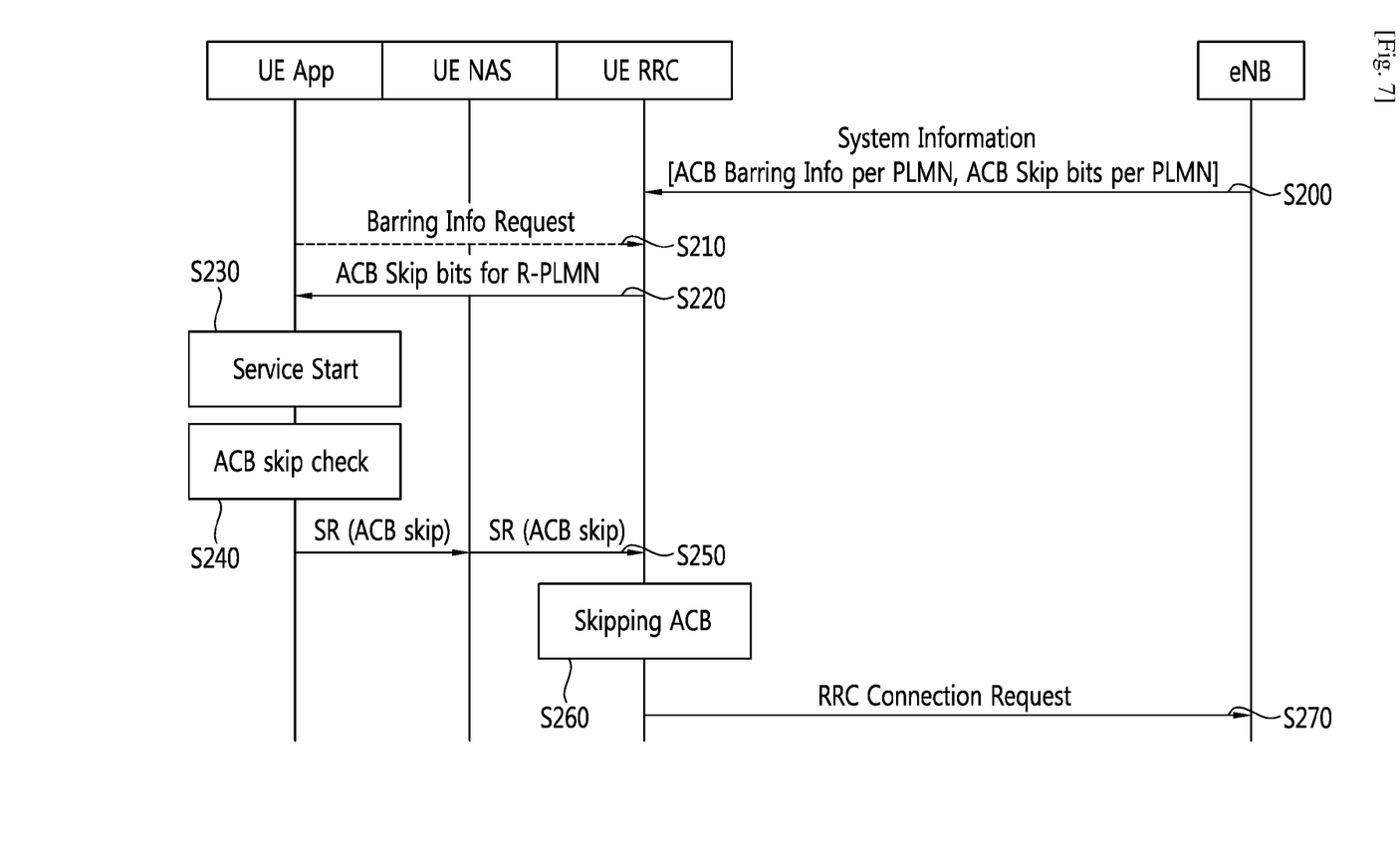
FIG. 7 shows an example of a method for performing ACB skip check for R-PLMN in an application layer according to an embodiment of the present invention.

FIG. 7 shows an example of a method for performing ACB skip check for R-PLMN in an application layer according to an embodiment of the present invention.

In step S200, the UE camps on a cell. The RRC layer of the UE receives system information including ACB barring information per PLMN and ACB skip bits per PLMN for all PLMNs sharing the cell. In step S210, the RRC layer of the UE may receive request for barring information from the application layer of the UE.

In step S220, the RRC layer of the UE forwards the received ACB skip bits for the PLMN to the application layer of the UE, such as MMTEL layer, upon receiving request from the application layer of the UE, upon PLMN (re-)selection, upon update of ACB skip bits at the cell, or upon update of system information at the cell. Alternatively, the RRC layer of the UE may forward the received ACB skip bits per PLMN for all PLMNs sharing the cell and indicate the R-PLMN to the application layer of the UE, upon receiving request from the application layer of the UE, upon PLMN (re-)selection, upon update of ACB skip bits at the cell, or upon update of system information at the cell.

In step S230, the application layer of the UE detects service start for a specific service/application such as MMTEL voice, MMTEL video, or SMS. In step S240, the application layer of the UE determines whether or not to skip ACB check by using the ACB skip bits corresponding to the R-PLMN (among the ACB skip bits). If the application layer of the UE determines to skip ACB check, in step 250, the application layer of the UE informs the NAS/RRC layer of the UE that ACB check shall be skipped via SR. Then, the NAS layer of the UE may also inform the RRC layer of the UE that ACB check shall be skipped.

In step S260, the RRC layer of the UE skips ACB check accordingly. In step S270, the RRC layer of the UE transmits the RRC connection request message to the eNB.

Figure 8:
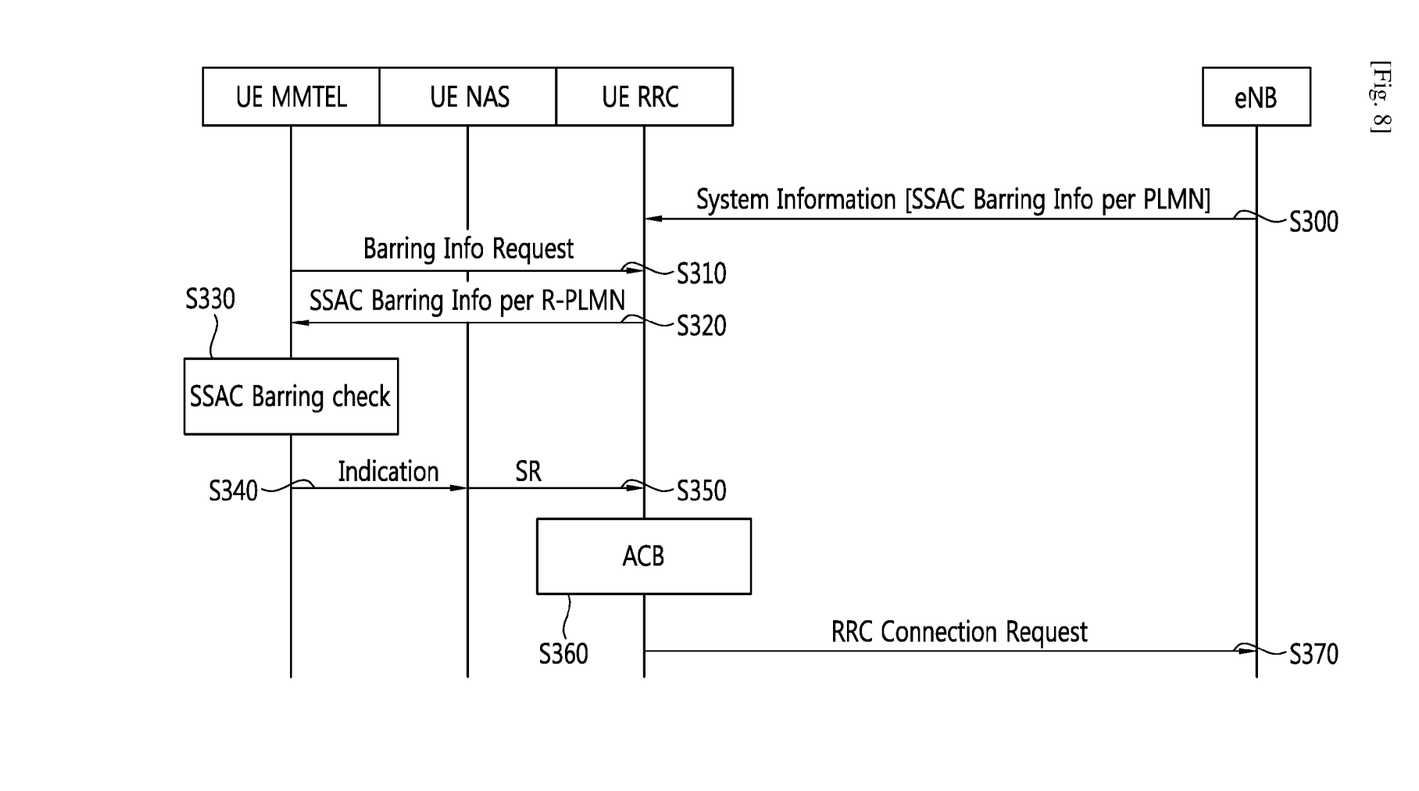
FIG. 8 shows an example of a method for performing SSAC barring check for R-PLMN in an application layer according to an embodiment of the present invention.

FIG. 8 shows an example of a method for performing SSAC barring check for R-PLMN in an application layer according to an embodiment of the present invention.

In step S300, the UE camps on a cell. The RRC layer of the UE receives system information including SSAC barring information per PLMN for all PLMNs sharing the cell. In step S310, the RRC layer of the UE receives request for barring information from the MMTEL layer of the UE.

In step S320, the RRC layer of the UE forwards the received SSAC barring information for the R-PLMN to the MMTEL layer of the UE, upon receiving the request from the MMTEL layer of the UE, upon PLMN (re-)selection, upon update of SSAC barring information at the cell, or upon update of system information at the cell. Alternatively, the RRC layer of the UE may forward the received SSAC barring information per PLMN for all PLMNs sharing the cell and indicates the R-PLMN to the MMTEL layer of the UE, upon receiving the request from the MMTEL layer of the UE, upon PLMN (re-)selection, upon update of SSAC barring information at the cell, or upon update of system information at the cell.)

The MMTEL layer of the UE detects service start for a specific service/application such as MMTEL voice or MMTEL video. In step S330, the MMTEL layer of the UE performs SSAC barring check by using the SSAC barring information corresponding to the R-PLMN (among the SSAC barring information for all PLMNs). If the UE passes the SSAC barring check, in step S340, the MMTEL layer of the UE indicates to the NAS layer of the UE about initiation of a session, and then in step S350, the NAS layer of the UE transmits the service request to the RRC layer of the UE.

In step S360, the RRC layer of the UE performs ACB check. Alternatively, the RRC layer of the UE may skip ACB check according to ACB skip bits for the R-PLMN. The ACB skip bits for the R-PLMN may be received via system information. In step S370, if the UE passes ACB check, the RRC layer of the UE transmits the RRC connection request message to the eNB.

Figure 9:
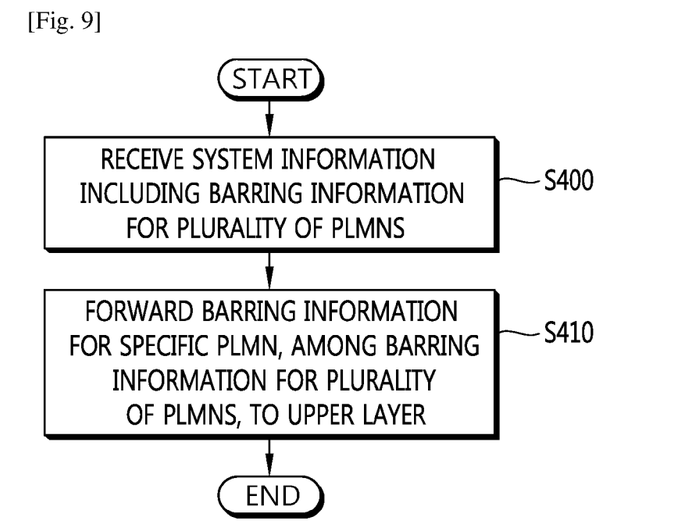
FIG. 9 shows an example of a method for transmitting barring information for a specific PLMN according to an embodiment of the present invention.

FIG. 9 shows an example of a method for transmitting barring information for a specific PLMN according to an embodiment of the present invention.

In step S400, the lower layer of the UE, i.e. RRC layer, receives system information including barring information for a plurality of PLMNs from the eNB. The barring information may be SSAC barring information. The system information may be a SIB2. The plurality of PLMNs may share a cell.

In step S410, the lower layer of the UE forwards barring information for a specific PLMN, among the barring information for the plurality of PLMNs, to the upper layer of the UE, i.e. MMTEL layer. The lower layer of the UE may forward the barring information for the specific PLMN upon receiving a request for the barring information for the specific PLMN from the upper layer, upon PLMN selection or reselection, upon update of the barring information at a cell, or upon update of the system information at the cell. The specific PLMN may be selected by the upper layer. The specific PLMN may be a R-PLMN.

The lower layer of the UE may further receive a service request from the NAS layer of the UE. The lower layer of the UE may further perform ACB check. The lower layer of the UE may further skip performing ACK check according to ACK skip bits for the specific PLMN. The lower layer of the UE may further transmit a RRC connection request message to the eNB.

According to an embodiment of the present invention, the SIB2, described in Table 1, may be modified as Table 2.

TABLE 2

-- ASN1STARTSystemInformationBlockType2 ::= SEQUENCE {ac-BarringInfo
SEQUENCE {ac-BarringForEmergency BOOLEAN,ac-BarringForMO-Signalling
AC-BarringConfig OPTIONAL, -- Need OPac-BarringForMO-Data AC-
BarringConfig OPTIONAL -- Need OP} OPTIONAL, -- Need OPradioResourceConfig
Common RadioResourceConfigCommonSIB,ue-TimersAndConstants UE-
TimersAndConstants,freqInfo SEQUENCE {ul-CarrierFreq ARFCN-ValueEUTRA
OPTIONAL, -- Need OPul-Bandwidth ENUMERATED {n6, n15, n25, n50, n75,
n100}OPTIONAL, -- Need OPadditionalSpectrumEmission AdditionalSpectrum
Emission},mbsfn-SubframeConfigList MBSFN-SubframeConfigList
OPTIONAL, -- Need ORtimeAlignmentTimerCommon TimeAlignment
Timer,...,lateNonCriticalExtension OCTET STRING (CONTAINING SystemInformation
BlockType2-v8h0-IEs)OPTIONAL, -- Need OP[[ ssac-Barring
ForMMTEL-Voice-r9 AC-BarringConfig OPTIONAL, -- Need OPssac-
BarringForMMTEL-Video-r9 AC-BarringConfig OPTIONAL -- Need OP]],[[ ac-
BarringForCSFB-r10 AC-BarringConfig OPTIONAL -- Need OP]][[ ac-
BarringSkipForMMTELVoice-r12 ENUMERATED {true} OPTIONAL, -- Need OP
ac-BarringSkipForMMTELVideo-r12 ENUMERATED {true} OPTIONAL, -- Need
OP ac-BarringSkipForSMS-r12 ENUMERATED {true} OPTIONAL, -- Need OP ac-
BarringPerPLMN-List-r12 AC-BarringPerPLMN-List-r12 OPTIONAL -- Need OP
]]{SystemInformationBlockType2-v8h0-IEs ::= SEQUENCE {multiBandInfoList
SEQUENCE (SIZE (1..maxMultiBands)) OF AdditionalSpectrumEmission
OPTIONAL, -- Need ORnonCriticalExtension SystemInformation-
BlockType2-v9e0-IEs OPTIONAL -- Need
OP}SystemInformationBlockType2-v9e0-IEs ::= SEQUENCE {ul-CarrierFreq-v9e0
ARFCN-ValueEUTRA-v9e0 OPTIONAL, -- Cond ul-FreqMaxnonCriticalExtension
SEQUENCE { } OPTIONAL -- Need OP}AC-BarringConfig ::= SEQUENCE
{ac-BarringFactor ENUMERATED {p00, p05, p10, p15, p20, p25, p30, p40,p50,
p60, p70, p75, p80, p85, p90, p95},ac-BarringTime ENUMERATED {s4, s8, s16,
s32, s64, s128, s256, s512},ac-BarringForSpecialAC BIT STRING
(SIZE(5))}MBSFN-SubframeConfigList ::=SEQUENCE (SIZE

TABLE 2-continued

```
(1..maxMBSFN-Allocations)) OF MBSFN-SubframeConfigAC-BarringPerPLMN -
List-r12 ::=SEQUENCE (SIZE (1.. maxPLMN-r11)) OF AC-BarringPerPLMN-r12
AC-BarringPerPLMN-r12 ::= SEQUENCE {plmn-IdentityIndex-r12 INTEGER
(1..maxPLMN-r11),ac-BarringInfo-r12 SEQUENCE {ac-BarringForEmergency-r12
BOOLEAN,ac-BarringForMO-Signalling-r12 AC-BarringConfig OPTIONAL, --
Need OPac-BarringForMO-Data-r12 AC-BarringConfig OPTIONAL -- Need OP}
OPTIONAL, -- Need OPac-BarringSkipForMMTELVoice-r12 ENUMERATED
{true} OPTIONAL, -- Need OPac-BarringSkipForMMTELVideo-r12
ENUMERATED {true} OPTIONAL, -- Need OPac-BarringSkipForSMS-r12
ENUMERATED {true} OPTIONAL, -- Need OPac-BarringForCSFB-r12 AC-
BarringConfig OPTIONAL, -- Need OPssac-BarringForMMTEL-Voice-r12 AC-
BarringConfig OPTIONAL, -- Need OPssac-BarringForMMTEL-Video-r12 AC-
BarringConfig OPTIONAL -- Need OP}-- ASN1STOP
```

Referring to Table 2, the SIB2 further includes "ac-BarringPerPLMN-List-r12" IE, which indicates the barring information for the plurality of PLMNs, including the barring information for the specific PLMN. The lower layer of the UE may forward the barring information for the specific PLMN, which may be specified by the "plmn-IdentityIndex" IE.

Figure 10:
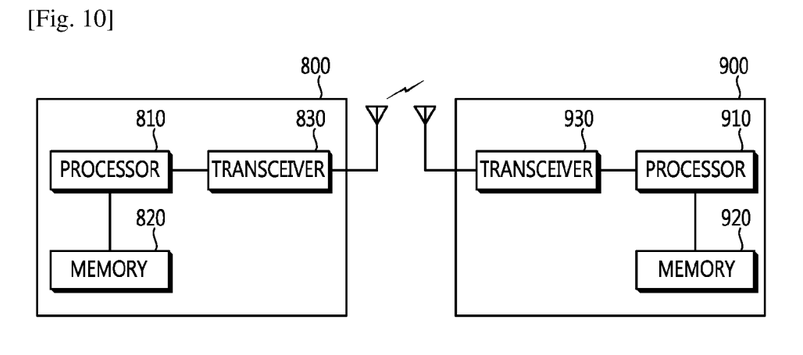
FIG. 10 shows a wireless communication system to implement an embodiment of the present invention.

Handling of SSAC related parameters according to an embodiment of the present invention may be as follows. Upon request from the upper layers, the UE shall:

1> if SystemInformationBlockType2 includes ac-BarringPerPLMN-List and the ac-BarringPerPLMN-List contains an AC-BarringPerPLMN entry with the plmn-IdentityIndex corresponding to the PLMN selected by upper layers:

2> select the AC-BarringPerPLMN entry with the plmn-IdentityIndex corresponding to the PLMN selected by upper layers;

2> use the selected AC-BarringPerPLMN entry (i.e. presence or absence of access barring parameters in this entry) irrespective of the common access barring parameters included in SystemInformationBlockType2;

1> forward the variables BarringFactorForMMTEL-Voice, BarringTime-ForMMTEL-Voice, BarringFactorForMMTEL-Video and BarringTimeForMMTEL-Video to the upper layers;

FIG. 10 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method performed by a user equipment (UE) in a wireless communication system, the method comprising:
receiving, by a radio resource control (RRC) layer of the UE from an evolved Node B (eNB), system information including service specific access control (SSAC) barring information for a plurality of public land mobile networks (PLMNs), wherein the SSAC barring information for the plurality of PLMNs includes information on a barring factor per each of the plurality of PLMNs and information on a barring time per each of the plurality of PLMNs;
selecting, by a non-access stratum (NAS) layer of the UE, a specific PLMN among the plurality of PLMNs;
selecting, by the RRC layer of the UE, specific SSAC barring information for the specific PLMN among the SSAC barring information for the plurality of PLMNs; and
forwarding, by the RRC layer of the UE to a multimedia telephony (MMTEL) layer of the UE, the specific SSAC barring information for the specific PLMN, wherein the specific SSAC barring information for the specific PLMN includes information on a barring factor for the specific PLMN and information on a barring time for the specific PLMN.

2. The method of claim 1, further comprising receiving, by the RRC layer of the UE from the MMTEL layer of the UE, a request for the SSAC barring information for the specific PLMN.

3. The method of claim 1, wherein the system information is a system information block type-2 (SIB2).

4. The method of claim 1, wherein the plurality of PLMNs share a cell.

5. The method of claim 1, wherein the specific PLMN is a registered PLMN (R-PLMN).

6. The method of claim 1, wherein the SSAC barring information for the specific PLMN is forwarded upon PLMN selection or reselection, upon update of the SSAC barring information at a cell, or upon update of the system information at the cell.

7. The method of claim 1, further comprising receiving, by the RRC layer of the UE from the NAS layer of the UE, a service request.

8. The method of claim 1, further comprising performing, by the RRC layer of the UE, an access control barring (ACB) check for a service request on the specific PLMN based on the specific SSAC barring information for the specific PLMN.

9. The method of claim 1, further comprising skipping, by the RRC layer of the UE, performing an access class barring (ACB) check according to ACB skip bits for the specific PLMN.

10. The method of claim 1, further comprising transmitting, by the RRC layer of the UE to the eNB, a RRC connection request message.

11. A user equipment (UE) comprising:
a memory;
a transceiver; and
a processor, coupled to the memory and the transceiver, that:
  controls the transceiver to receive, by a radio resource control (RRC) layer of the UE from an evolved Node B (eNB), system information including service specific access control (SSAC) barring information for a plurality of public land mobile networks (PLMNs), wherein the SSAC barring information for the plurality of PLMNs includes information on a barring factor per each of the plurality of PLMNs and information on a barring time per each of the plurality of PLMNs,
  selects, by a non-access stratum (NAS) layer of the UE, a specific PLMN among the plurality of PLMNs,
  selects, by the RRC layer of the UE, specific SSAC barring information for the specific PLMN among the SSAC barring information for the plurality of PLMNs, and
  forwards, by the RRC layer of the UE to a multimedia telephony (MMTEL) layer of the UE, the specific SSAC barring information for the specific PLMN, wherein the specific SSAC barring information for the specific PLMN includes information on a barring factor for the specific PLMN and information on a barring time for the specific PLMN.

* * * * *